United States Patent [19]

Anderson et al.

[11] 4,314,324

[45] Feb. 2, 1982

[54] TRANSFORMER POWER SUPPLY HAVING AN INDUCTIVELY LOADED FULL WAVE RECTIFIER IN THE PRIMARY

[75] Inventors: Emmett R. Anderson, Campbell; Douglas S. Schatz, San Jose, both of Calif.

[73] Assignee: Energy Research Associates, Campbell, Calif.

[21] Appl. No.: 92,280

[22] Filed: Nov. 8, 1979

[51] Int. Cl.$^3$ .............................................. H02P 13/24

[52] U.S. Cl. .......................................... 363/90; 363/39; 363/129; 323/237; 315/283

[58] Field of Search .................................... 363/27-28, 363/39-40, 44-48, 90-92, 125, 126, 128-130; 323/7-8, 24, 34, 36, 82, 237, 246; 315/258, 283

[56] References Cited

U.S. PATENT DOCUMENTS

| | | | |
|---|---|---|---|
| 3,845,380 | 10/1974 | Lepp et al. | 323/24 X |
| 3,877,896 | 4/1975 | Muskovac | 323/24 X |
| 3,976,931 | 8/1976 | Sterling | 363/90 |
| 4,030,017 | 6/1977 | Brown | 323/8 X |
| 4,176,310 | 11/1979 | Elenga et al. | 315/283 X |

*Primary Examiner*—William M. Shoop
*Assistant Examiner*—Peter S. Wong
*Attorney, Agent, or Firm*—Harry E. Aine; Harvey G. Lowhurst

[57] ABSTRACT

In a transformer power supply, a full wave rectifier is series connected in circuit with the primary winding of the transformer such that the current flowing through the primary winding of the transformer flows in series through the input of the full wave rectifier. An inductive load is connected across the output terminals of the full wave rectifier such that the rectified output current flows through the inductive load. The full wave rectifier preferably uses silicon controlled rectifiers which are phase triggered in such a manner so as to control their conduction angles so as to control the power flow from the source to the load connected to the secondary of the transformer. The inductance of the load for the rectifier preferably exceeds the critical inductance so as to minimize ripples in the secondary of the transformer. This type of power supply circuit is particularly useful for supplying power to an electron gun which is subject to arcing. The inductive load for the rectifier reduces the transient voltages impressed on the transformer resulting from SCR phase control and also minimizes AC voltage drop across the inductive load while providing transient current limiting as may be encountered by arcing of the electron gun.

9 Claims, 4 Drawing Figures

TRANSFORMER POWER SUPPLY HAVING AN INDUCTIVELY LOADED FULL WAVE RECTIFIER IN THE PRIMARY

BACKGROUND OF THE INVENTION

The present invention relates in general to transformer power supplies and, more particularly, to power supplies of the type wherein phase control of the firing times of silicon controlled rectifiers in the primary winding of the transformer serves to control the flow of power through the transformer to the load.

DESCRIPTION OF THE PRIOR ART

Heretofore, transformer power supplies of the type employing phase controlled silicon controlled rectifiers in the primary winding of the transformer have been employed for controlling the flow of power from the source through the transformer to the load. In these prior art transformer power supplies, inductors have been provided in series with the primary winding for the purpose of limiting transient current flow through the primary winding, thereby reducing undesired ripples in the output of the transformer. Such a power supply is disclosed in U.S. Pat. No. 3,609,200 issued Sept. 28, 1971.

The problem with the provision of the series inductance in the primary winding of the transformer is that relatively high transient voltages are dropped across the current limiting inductor during arcing conditions in the load connected to the secondary of the transformer. Also, high transient voltages are developed across the current limiting inductor during phase control firing of the silicon controlled rectifiers which produces undesired transient voltages in the primary winding of the transformer which are coupled through the transformer to the load causing undesired ripple in the load.

It is also known from prior art phase controlled SCR transformer power supplies to feed the power from the source through a bridge rectifier having phase controlled silicon controlled rectifiers to produce a DC output which is thence fed through an inverter circuit into and through the primary winding of the transformer. In such a device, an inductor was provided in series with the DC current flow from the rectifier through the inverter circuit to provide proper operation of the inverter.

The inverter was utilized to increase the frequency of the current supplied to the primary of the transformer such that small size and weight magnetic components could be utilized in the transformer. It was contemplated in this prior art device that the primary winding would operate at frequencies of 400 Hz, 1 kilohertz or higher in order to provide a fast response, i.e., a cut back in case of arcing in the load. Such a power supply is disclosed in U.S. Pat. No. 3,544,913 issued Dec. 1, 1970.

One of the problems associated with this second prior art device is the additional complexity introduced by the inverter circuit and its attendant cost.

SUMMARY OF THE PRESENT INVENTION

The principal object of the present invention is the provision of an improved transformer power supply.

In one feature of the present invention, an inductively loaded full wave rectifier is connected in series with the primary winding of the transformer for loading of the primary winding of the transformer so as to reduce unwanted ripple in the output of the transformer.

In another feature of the present invention, the inductive load for the full wave rectifier has a value of inductance exceeding the critical inductance so that the ripple in the secondary winding of the transformer is minimized.

In another feature of the present invention, the inductive load for the full wave rectifier has a value of inductance which is an inverse function of the direct current flowing therethrough so that the transient voltage and transient current limiting characteristics of the inductive load are matched to an electron gun load subject to arcing conditions.

Other features and advantages of the present invention will become apparent upon a perusal of the following specification taken in connection with the accompanying drawings wherein:

DESCRIPTION OF THE PREFERRED EMBODIMENTS

Figure 1:
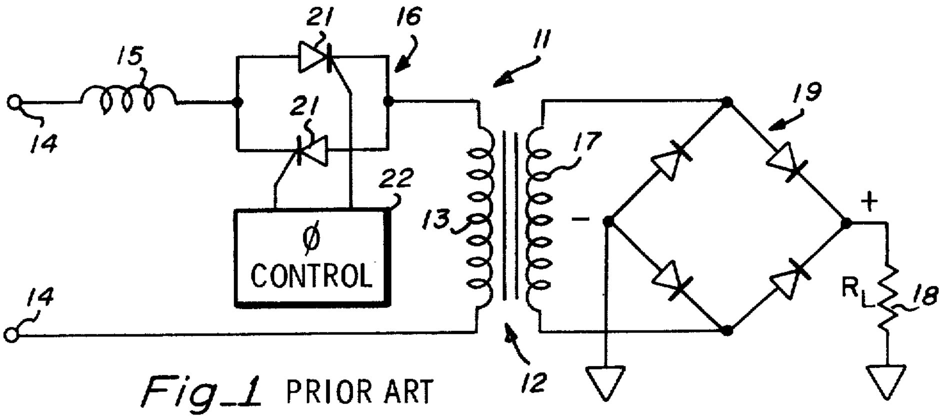
Fig 1 PRIOR ART
FIG. 1 is a schematic circuit diagram partly in block diagram form, of a prior art phase controlled transformer power supply.

Referring now to FIG. 1 there is shown the prior art phase controlled silicon controlled rectifier transformer power supply 11. The power supply includes a transformer 12 having a primary winding 13 connected across a source of AC power, for example, a 220 volt single phase 60 hertz source, at terminals 14 via the intermediary of a current limiting choke 15 and a phase controlled silicon controlled full wave rectifier 16.

The transformer 12 includes a secondary winding 17 connected to a load 18 via the intermediary of a full wave rectifying bridge 19. The power flow from the source to the load 18 is controlled via the intermediary of the phase controlled full wave rectifier 16 which has parallel connected silicon controlled rectifiers 21 connected with opposite polarity to conduct on successive half cycles of the electrical current supplied from the source. The conduction angles for the silicon controlled rectifiers 21 are controlled by a phase control trigger circuit 22 of conventional design, for example that disclosed in an article titled "Advances in SCR Firing Circuit Technology" appearing in Solid State Power Conversion of July/August 1978. This type of prior art power supply 11 is disclosed in the aforecited U.S. Pat. No. 3,609,200. The series inductor 15 serves to suppress switching transients produced by the switching of the SCRs 21 for controlling the flow of power from the source to the load 18.

Figure 2:
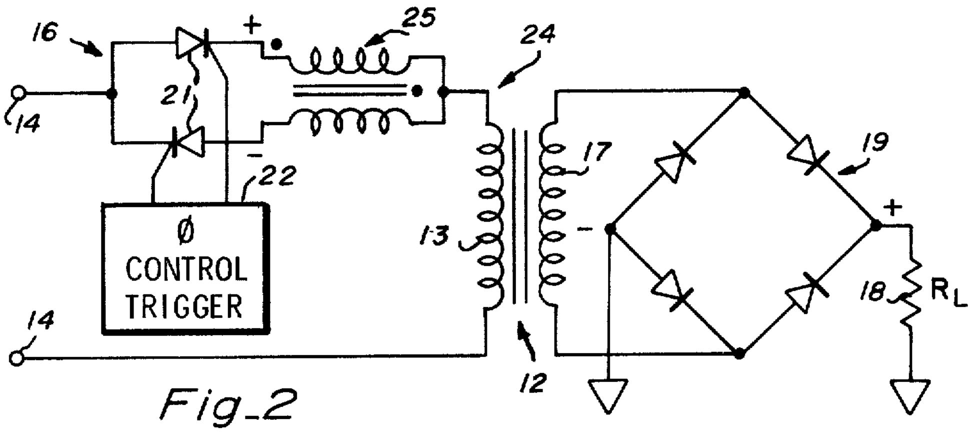
FIG. 2 is a schematic circuit diagram, partly in block diagram form, of a phase controlled transformer power supply incorporating features of the present invention.

Referring now to FIG. 2 there is shown a power supply circuit 24 incorporating features of the present invention. The power supply 24 is similar to that of FIG. 1 with the exception that a transient voltage and transient current limiting inductor 25 is connected across the rectifying output terminals of the silicon controlled rectifier 16 so that rectified output current of the rectifier 16 flows through the windings of the centertaped inductor 25. The advantage to connecting the inductive load 25 across the output terminals of the full wave rectifier 16 are: that it reduces the transient voltages impressed on the transformer 12 resulting from transient switching in the SCR phase controlled rectifier circuit 16 and, in addition, it serves to reduce the AC voltage drop across the current limiting inductor 25 while still providing transient current limiting in case of arcing in the load 18.

Functionally, the inductive load 25 is reflected into the primary of the transformer 12 as though it were in series with the primary winding 13 to provide dynamic current limiting with circuitry which allows discharge of the magnetic energy stored in the inductor 25 during overload conditions without creating high voltages in the rectifier 19, transformer 12 and adjacent circuitry.

Figure 3:
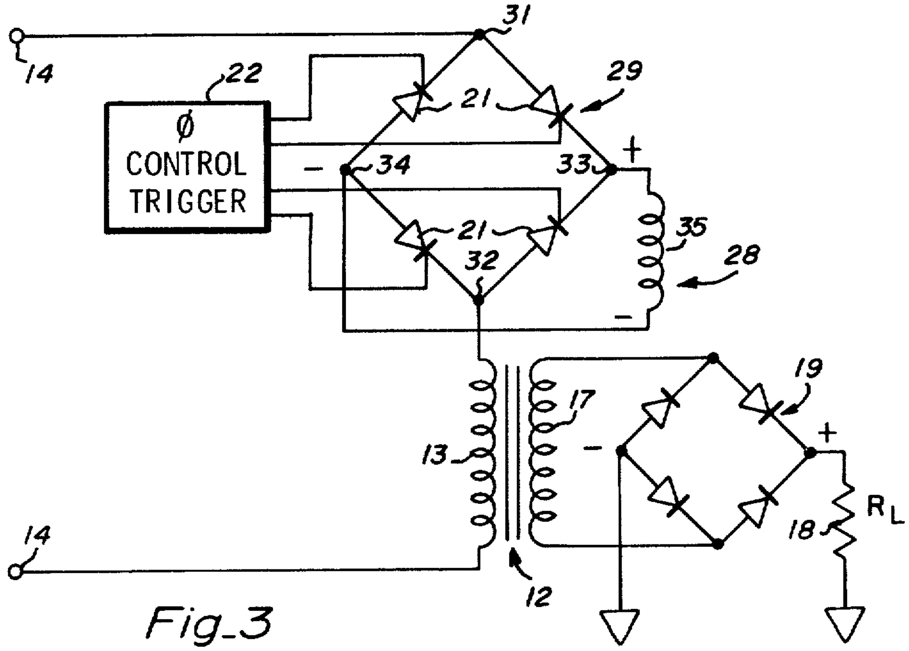
FIG. 3 is an alternative embodiment to the circuit of FIG. 2.

Referring now to FIG. 3, there is shown an alternative embodiment to the power supply circuit of FIG. 2 wherein the power supply circuit 28 of FIG. 3 includes a full wave bridge rectifier circuit 29 is lieu of the full wave rectifier circuit 16 of FIG. 2. The full wave bridge rectifier includes input terminals 31 and 32 connected in series with the primary winding 13 of the transformer 12 for supplying AC power to the bridge rectifier 29. The output terminals 33 and 34 of the bridge 29 are connected across an inductive load 35 for the rectifier bridge 29. Thus, the rectified output current of the bridge rectifier 29 flows through the inductive load 35. The inductive load 35 functions in the same manner as inductive load 25 of the circuit of FIG. 2 and has the same advantages.

Figure 4:
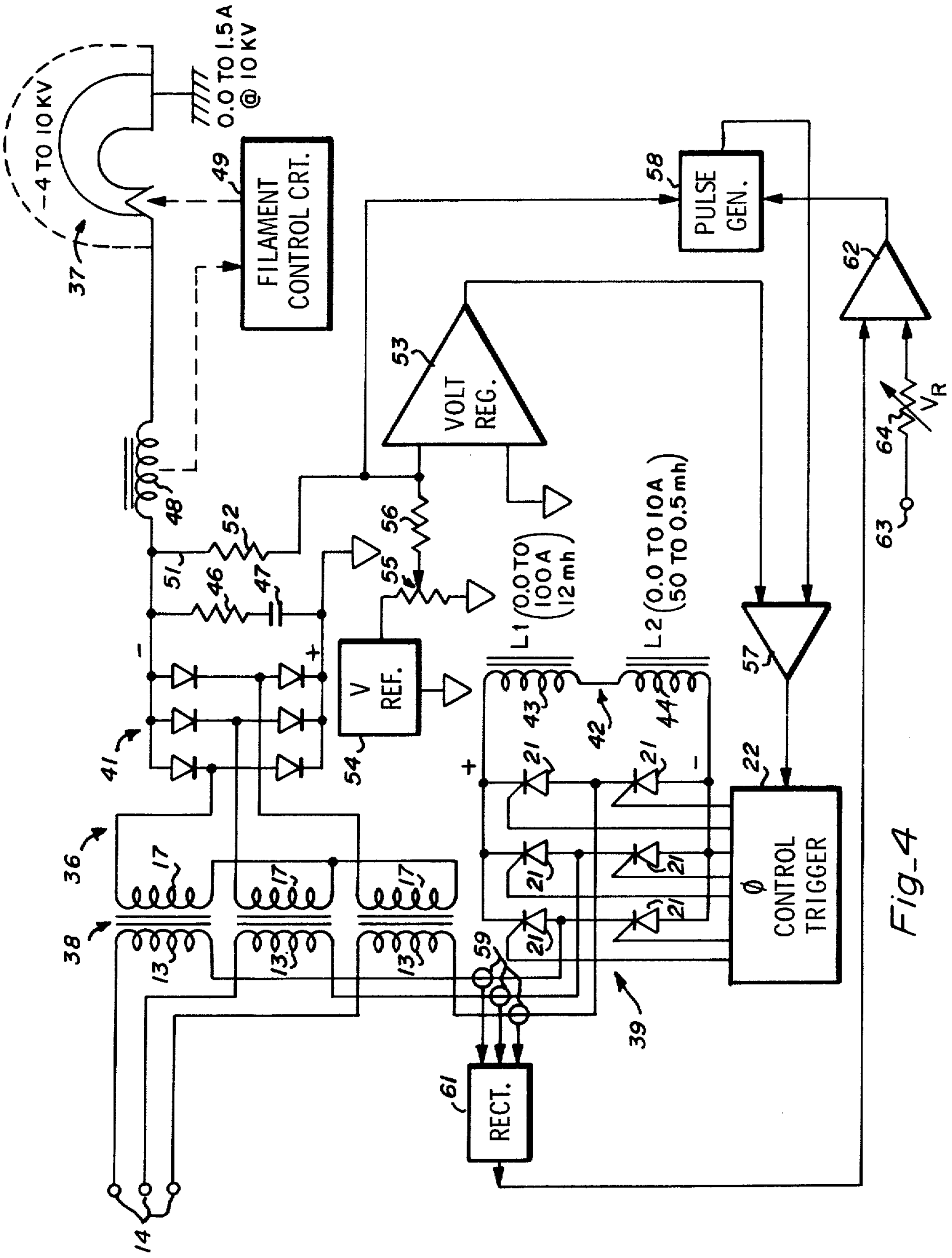
FIG. 4 is a schematic circuit diagram of a three phase silicon controlled rectifier power supply incorporating features of the present invention and supplying power to an electron beam load.

Referring now to FIG. 4 there is shown a three phase power supply incorporating features of the present invention as utilized for supplying power to an electron gun 37 utilized in an evacuated electron beam furance system.

In power supply circuit 36, the transformer comprises a 3-phase Y—Y connected rectifier step up transformer 38 having primary windings 13 and secondary windings 17. In a typical example, the primary windings 13 are supplied from a 220 volt class three phase 60 hertz power line serving as the source. The power supply supplies output DC current to the electron gun 37 at an operating voltage settable within the range of −4 kv to −10 kv D.C. The ratio of the transformer windings is such that when the phase controlled trigger circuit 22 has its outputs adjusted for 120° maximum conduction angle through the silicon controlled rectifiers 21 for each phase which are connected as a three phase full wave bridge rectifier circuit 39, the DC output of the rectifier circuit 41 is approximately 11.5 kilovolts. The 1.5 KV additional voltage is provided for regulation and losses in the regulating elements.

The primary windings 13 are connected across the input terminals of the three phase full wave bridge rectifier circuit 39 and the DC output of the bridge rectifier circuit 39 is connected across an inductive load 42 consisting of a series connection of chokes 43 and 44. Choke 43 has an inductance of approximately 12 milihenrys from 0.0 to 100 amps and choke 44 has an inductance that varies from 50 to 0.5 milihenrys with current flowing therethrough varying from 0.0 to 10 amps. The chokes 43 and 44 offer a low impedance path to direct current and an increasingly high impedance to high frequency currents or high speed changes in current.

As the trigger pulses out of trigger circuit 22 are delayed in time relative to the anode voltage on the SCRs 21, less current is conducted through the SCRs 21, and the currents flowing through the primary windings 13 of the transformer 38 are likewise reduced. When SCR trigger pulses are sufficiently delayed, no current flows in the primary of the transformer 38 and therefore no voltage exists on the output of the power supply 36. As the trigger pulses are advanced in phase relative to the phase of the anode voltage on the SCRs 21 starting from the cut off condition, pulses of current commence to flow. As the trigger pulses are further advanced maximum current will flow at 120 electrical degrees of conduction providing that the reactance of the chokes 43 and 44 is large relative to the equivalent reflected resistance of the load. The equivalent reflected resistance is the cathode voltage of the electron gun 37 divided by the electron beam current and corrected by the turns ratio of the transformer 38. More particularly, the combined inductance of chokes 43 and 44 should satisfy the following relation:

$$\frac{L}{R_{Lref}} > \frac{\tau}{2n}$$

where L is the critical inductance, $R_{Lref}$ is the load resistance of the electron gun connected to the secondary winding of the transformer 38 as reflected back through the transformer 38 into the primary windings 13, $\tau$ is the period of the electrical power supplied to the primary winding from the source, and n is the number of phases of the power supplied from the source to the transformer.

In the particular case of an electron gun load, the resistance of the load is a function of the beam voltage and current. Thus by making the inductance of chokes 43 and 44 a proper function of current, the critical inductance for matching the power supply to the load is made a function of current so that the power supply characteristics are matched to those of the load.

A resistor 46 of 3.5 kilohms and a capacitor 47, as of 0.05 microfarads are connected across the output terminals of the secondary rectifier 41 to provide a low pass filter characteristic for suppressing and loading down transients in the output of the rectifier 41. A current sense transductor 48 is coupled in series with the DC current flow from the output of the rectifier 41 for monitoring the beam current of the electron gun 37. The output of the current sense transductor is fed to one input of a filament control circuit 49 for controlling the heating current fed through the filament of the electron gun in accordance with the current drawn by the gun.

The output voltage of the secondary rectifier 41 is monitored by means of a lead 51 and a series connected current limiting resistor 52. The sensed voltage is fed to one input of a voltage regulator 53 for comparison against a reference voltage derived from a voltage reference source 54, potentiometer 55 and current limiting resistor 56. The difference between the reference voltage and the sensed voltage is applied to one input of the voltage regulator for supplying an output from the voltage regulator 53 which is fed via a buffer amplifier 57 to the phase control trigger circuit 22 for advancing or retarding the firing of the SCRs relative to the anode voltage on the SCRs so as to regulate the output voltage of the secondary transformer 41 to the desired output voltage as determined by the setting of the potentiometer 55. In a typical example for the electron gun load 37, the output D.C. voltage is regulated to a desired setting in the range of −4 kv to −10 kv.

Another sample of the output D.C. voltage is derived via lead 52 and fed to one input of a pulse generator 58 having an internal comparator which compares the sensed voltage with a reference. When the sensed voltage approaches zero, indicating an arc in the electron gun 37, the pulse generator 58 produces an output pulse which is fed via the buffer amplifier 57 to the input of the phase control circuit for retarding the phase of the firing circuit so as to reduce the conduction angles of the SCRs 21 and limit the current supplied to the load 37. When the current is limited or cut off to the load 37 via the action of the phase control trigger circuit 22 and primary bridge rectifier 39, the current stored in the inductive load 42 in the output of the primary phase controlled rectifier 39 is fed back into the source or line via terminals 14.

The current flowing in the primary windings is detected by means of inductor pick-ups 59 and fed to rectifiers 61 wherein the signals are rectified and thence fed to one input of a comparator 62 for comparison with a reference input derived from a voltage reference $V_R$ at 63 via a variable resistor 64. The reference input to the comparator 62 is selected such that when the current flowing in the primary windings exceeds 150% of the normal full rated current, an output is generated which is fed to the pulse generator 58 which then generates a pulse which is fed via the buffer amplifier 57 to the phase control trigger circuit 22 for retarding the phase and diminishing the conduction angle of the SCRs in the primary bridge rectifier 39 so as to cut off the current and power fed from the source to the load 37. Thus, the primary bridge rectifier circuit 39 is controlled in such a manner that power will not be restored in the load until such time as the current flowing in the primary is reduced below a certain predetermined percentage of full rated current.

What is claimed is:

1. In a transformer power supply:

transformer means having a primary winding means for connection to a source of alternating electrical power and having a secondary winding means inductively coupled to said primary winding means for connection to a load for transforming alternating electrical power from the source to the load at the frequency of the source;

full wave rectifying means having an input for connection in series with said primary winding of said transformer means for supplying input alternating electrical power at the frequency of the source to said full wave rectifying means and having an output for supplying output rectified current on each half cycle of the input power in response to the application of input alternating current to said input of said full wave rectifying means from the source;

inductive load means for connection across said output of said full wave rectifying means for inductively loading said full wave rectifying means and hence for inductive loading of said primary winding; and wherein the load to be connected to the output of said secondary winding of said transformer means has a predetermined resistance characteristic and wherein the inductance of said inductive load means for said full wave rectifying means exceeds the critical inductance value found from the relation:

$$\frac{L}{R_{Lref}} > \frac{\tau}{2n}$$

where L is the critical inductance, $R_{Lref}$ is the load resistance to be connected to said secondary winding of said transformer means as reflected through said transformer means into said primary winding means, $\tau$ is the period of the electrical power supplied to said primary winding means from the source, and n is the number of phases of the power supplied from the source to said transformer means.

2. The apparatus of claim 1 including, trigger means for controlling the relative phases of the electrical conduction cycles of said full wave rectifying means for controlling the flow of current through said transformer means from the source to the load on said secondary winding means, feedback means responsive to an output of said transformer means for deriving a control signal and for feeding same back to said trigger means for controlling said trigger means so as to control the flow of current through said transformer means from the source to the load on said secondary winding means.

3. The apparatus of claim 1 including, second rectifier means connected to the output of said secondary winding means of said transformer means for rectifying the power to the load.

4. The apparatus of claim 1 wherein said inductive load means for said rectifying means includes a pair of series connected inductive choke means one of said choke means having a value of inductance which is an inverse function of direct current flowing therethrough, whereby said inductive load on said rectifying means and hence on said primary winding means is caused to be an inverse function of current flowing in said primary winding of said transformer means.

5. The apparatus of claim 3 including an electron gun means having an anode electrode and cathode electrode for producing a beam of electrons flowing to a utilization device, said electron gun means being connected to said secondary winding of said transformer means via the intermediary of said second rectifier means and serving as the load for said secondary winding means of said transformer means.

6. The apparatus of claim 5 wherein said inductive load means for said full wave rectifying means includes a pair of series connected choke means, one of said choke means having a value of inductance which is an inverse function of the direct current flowing therethrough, whereby said inductive load on said full wave rectifying means and hence on said primary winding means is caused to be an inverse function of current flowing in said primary winding means of said transformer means.

7. In a transformer power supply;

transformer means having a primary winding for connection to a source of alternating electrical power and having a secondary winding means inductively coupled to said primary winding means for connection to a load for transforming alternating electrical power from the source to the load at the frequency of the source;

full wave recitfying means having an input for connection in series with said primary winding of said transformer means for supplying input alternating electrical power at the frequency of the source to said full wave rectifying means and having an output for supplying output rectified current on each half cycle of the input power in response to the application of input alternating current to said input of said full wave rectifying means from the source;

inductive load means for connection across said output of said full wave rectifying means for inductively loading said full wave rectifying means and hence for inductive loading of said primary winding; and trigger means for controlling the relative phases of the electrical conduction cycles of said full wave rectifying means for controlling the flow of current through said transformer means from the source to the load on said secondary winding means; and feedback means responsive to an output of said transformer means for deriving a control signal and feeding same back to said trigger means for controlling said trigger means so as to control the flow of current through said transformer means from the source to the load on said secondary winding means as a function of the output of said transformer means.

8. The apparatus of claim 7 wherein the output of said transformer means to which said feedback means is responsive is the output voltage of said transformer means.

9. The apparatus of claim 8 wherein said feedback means includes comparator means for comparing the output voltage of said transformer means against a reference voltage to derive the control signal so as to regulate the output voltage of said transformer means to the desired output voltage as determined by the reference voltage fed to said comparator means.

* * * * *